(12) United States Patent
Hershkowitz et al.

(10) Patent No.: US 6,267,912 B1
(45) Date of Patent: *Jul. 31, 2001

(54) DISTRIBUTED INJECTION CATALYTIC PARTIAL OXIDATION PROCESS AND APPARATUS FOR PRODUCING SYNTHESIS GAS

(75) Inventors: Frank Hershkowitz, Liberty Corner; Harry W. Deckman; Robert P. Reynolds, both of Clinton, all of NJ (US); Constantine P. Gonatas, Houston, TX (US); John W. Fulton, Randolph, NJ (US); Leonard Schoenman, Citrus Heights; Jack I. Ito, Sacramento, both of CA (US); Leroy R. Clavenna, Baton Rouge, LA (US)

(73) Assignee: Exxon Research and Engineering Co., Florham Park, NJ (US)

(*) Notice: Subject to any disclaimer, the term of this patent is extended or adjusted under 35 U.S.C. 154(b) by 0 days.

This patent is subject to a terminal disclaimer.

(21) Appl. No.: 08/845,700

(22) Filed: Apr. 25, 1997

(51) Int. Cl.[7] .............. C07C 1/02; C07C 27/00; C01B 31/18; C01B 3/24
(52) U.S. Cl. .............. 252/373; 423/418.2; 423/650; 518/703
(58) Field of Search ............... 252/373; 423/650, 423/418.2; 518/703

(56) References Cited

U.S. PATENT DOCUMENTS

| 3,542,894 | 11/1970 | Bartholome et al. | 260/679 |
|---|---|---|---|
| 3,881,701 | 5/1975 | Schoenman et al. | 259/4 |

(List continued on next page.)

FOREIGN PATENT DOCUMENTS

| 0303439 | 2/1989 | (EP) . | |
|---|---|---|---|
| 303438 | 2/1989 | (EP) | 252/373 |
| WO/90/06297 | 6/1990 | (WO) . | |

OTHER PUBLICATIONS

T. S. Christensen and I. I. Primdahl, "Improve Syngas Production Using Autothermal reforming" Petrochemical/Chemical Developments, Reprinted from Mar. 1994 *Hydrocarbon Processing®*.

D. F. Calhoon, J. I. Ito and D. L. Kors, Investigation of Gaseous Propellant Combustion and Associated Injector/Chamber Design Guidelines, NTIS, N73 29799, Aerojet Liquid Rocket Company, Sacramento, CA Jul. 1973.

*Primary Examiner*—Gary P. Straub
*Assistant Examiner*—Melanie C. Wong
(74) *Attorney, Agent, or Firm*—Jay Simon (57) ABSTRACT

A novel injector/reactor apparatus and an efficient process for the partial oxidation of light hydrocarbon gases, such as methane, to convert such gases to useful synthesis gas for recovery and/or subsequent hydrocarbon synthesis. Sources of a light hydrocarbon gas, such as methane, and oxygen or an oxygen-containing gas are preheated and pressurized and injected through an injector means at high velocity into admixture with each other in the desired relative proportions, at a plurality of mixing nozzles which are open to the catalytic partial oxidation reaction zone and are uniformly-spaced over the face of the injector means, to form a reactant gaseous premix having a pressure drop equal to at least about 3% of the lowest upstream pressure of either of said gases. The gaseous premix is injected in a time period which is less than its autoignition time, preferably less than 9 milliseconds, at a velocity between about 25 to 1000 feet/second, into a catalytic partial oxidation zone so that the gaseous premix reacts in the presence of the fixed catalyst to reduce the amounts of $CO_2$, $H_2O$ and heat produced by the partial oxidation reaction, to form a useful syngas which is cooled and recovered.

22 Claims, 3 Drawing Sheets

U.S. PATENT DOCUMENTS

| | | | |
|---|---|---|---|
| 3,881,707 | 5/1975 | Schoenman et al. | 252/373 |
| 4,371,379 | 2/1983 | Brent et al. | 252/373 |
| 4,394,137 | 7/1983 | Marion et al. | 252/373 |
| 4,801,092 | 1/1989 | Webber et al. | 239/418 |
| 4,844,837 | 7/1989 | Heck et al. | 252/373 |
| 4,877,550 | 10/1989 | Goetsch et al. | 252/373 |
| 5,143,647 | 9/1992 | Say et al. | 252/373 |
| 5,160,456 | 11/1992 | Lahn et al. | 252/373 |
| 5,292,246 | 3/1994 | Gateau et al. | 431/328 |
| 5,488,826 | 2/1996 | Paas | 60/299 |
| 5,492,649 | 2/1996 | Christensen | 252/372 |
| 5,510,056 | 4/1996 | Jacobs et al. | 252/373 |

DISTRIBUTED INJECTION CATALYTIC PARTIAL OXIDATION PROCESS AND APPARATUS FOR PRODUCING SYNTHESIS GAS

BACKGROUND OF THE INVENTION

Field of the Invention

The present invention relates to improvements in processes and apparatus for producing synthesis gas, or syngas, from light hydrocarbon gas such as methane or natural gas by the oxidation thereof. Such syngas, comprising a mixture of carbon monoxide and hydrogen, is useful for the preparation of a variety of other valuable chemical compounds, such as by application of the Fischer-Tropsch process.

The combustion stoichiometry of methane gas at 1000° F. is highly exothermic and produces $CO_2$ and $H_2O$ according to the following reaction:

$$CH_4 + 2.O_2 \rightarrow CO_2 + 2H_2O \quad (-190.3 \text{ kcal/g mol } CH_4).$$

The formed gases are not useful for the production of valuable chemical compounds, and the high temperatures generated present problems with respect to reactors and catalysts which would be required to produce valuable products from the formed gases.

It is known to produce useful gases, known as synthesis gases or syngases, by partial oxidation of methane and other light hydrocarbon gases, by steam or CO2 reforming of methane and other light hydrocarbon gases, or by some combination of these two chemistries. The partial oxidation reaction of methane is a less highly exothermic reaction which, depending upon the relative proportions of the methane and oxygen and the reaction conditions, can proceed according to the following stoichiometry:

$$2CH_4 + 2O_2 = 2CO + 2H_2 + 2H_2O \quad (-64 \text{ kcal/g mol } CH_4).$$

$$2CH_4 + 1.5O_2 = 2CO + 3H_2 + 2H_2O \quad (-34.9 \text{ kcal/g mol } CH_4).$$

or $$2CH_4 + O_2 = 2CO + 4H_2 + 0H_2O \quad (-5.7 \text{ kcal/g mol } CH_4).$$

It is most desirable to enable the partial oxidation reaction to proceed according to the latter reaction in order to produce the most valuable syngas and minimize the amount of heat produced, thereby protecting the apparatus and the catalyst bed, and to reduce the formation of steam, thereby increasing the yield of hydrogen and carbon monoxide, and enabling the steam-reforming reaction to convert any steam and hydrogen into useful syngas components.

Conventional syngas-generating processes include the gas phase partial oxidation process (GPOX), the autothermal reforming process (ATR), the fluid bed syngas generation process (FBSG), the catalytic partial oxidation process (CPO) and various processes for steam reforming. Each of these processes has advantages and disadvantages when compared to each other.

The GPOX process, illustrated for example by U.S. Pat. No. 5,292,246; UK Application GB 2,202,321A and EPO Application 0 312,133, involves the oxidation of the feed hydrocarbon gaseous, liquid or solid form, in the gas phase rather than on a catalyst surface. The individual components are introduced at a burner where they meet in a diffusion flame, which produces over-oxidation and excessive heat generation. The gas may be preheated and pressurized, to reduce the reaction time.

The ATR process and the FBSG process involve a combination of gas phase partial oxidation and steam reforming chemistry.

In the ATR process, illustrated for example by U.S. Pat. No. 5,492,649 and Canadian Application 2,153,304, the hydrocarbon feed and the oxygen feed, and optionally steam, are heated, and mixed at the outlet of a single large coaxial burner or injector which discharges into a gas phase oxidation zone. The gases are reacted in the gas phase in the partial oxidation combustion zone, and then flow into a large bed of steam reforming catalyst, such as large catalyst pellets, or a monolithic body, to complete steam reforming. The entire hydrocarbon conversion is completed by a single reactor aided by internal combustion. The burner is the key element because it mixes the feedstreams in a turbulent diffusion flame. The reaction products are introduced to the fixed bed catalyst zone, preferably of large catalyst pellets, at high temperatures from the combustion chamber, due to the over-oxidation which occurs in the diffusion flame of the burner, where the oxygen and hydrocarbon gas meet. The diffusion flame includes oxygen-rich and hydrocarbon-rich zones. These result in both complete combustion and substantially higher temperatures, in the oxygen-rich zones, and hydrocarbon cracking and soot-formation, in the hydrocarbon-rich zones.

In the ATR process, the gases are intended to react before they reach the catalyst, i.e., the oxidation chemistry occurs in the gas phase, and only the steam reforming chemistry occurs in the catalytic bed. In fact, long residence times are required because diffusion flames are initiated with a large amount of over-oxidation, accompanied by a large amount of heat. Thus, time is required for the relatively slow, endothermic gas phase steam reforming reactions to cool the gas enough for introduction into the catalyst bed to prevent thermal damage to the catalyst.

In the FBSG process illustrated for example by U.S. Pat. Nos. 4,877,550; 5,143,647 and 5,160,456, the hydrocarbon gas, such as methane, and oxygen or an oxygen-supplying gas are introduced separately into a catalyst fluid bed for mixing therewithin. While the gases may be introduced at a plurality of sites, to more evenly distribute the gases over the inlet of the fluid bed of the reactor, the fact that the gases mix within the fluid bed results in over-oxidation hot spots and catalyst sintering or agglomeration due to the oxygen concentration being higher and closer to full-combustion stoichiometry in areas closest to the oxygen injection sites. The gas phase partial oxidation and steam reforming chemistry employed in the FBSG and the Autothermal Reforming (ATR) process have very similar material balance when using similar feed. However, ATR is limited in size by the scaleability of its injector design, and the more-scaleable FBSG is economically debited by the cost of fluid solids and dust cleanup and by the expense of replacing agglomerated and/or eroded catalyst. The dust comprises catalyst fines due to catalyst attrition in the bed, and these fines are expensive to clean out of the syngas. While the chemistry is correct, these two processes have significant drawbacks. Both require very large reactors. For FBSG there is a significant expense in fluid solids management. For Autothermal Reforming there is a large and problematic methane/oxygen feed nozzle.

CPO (catalytic partial oxidation) attempts to eliminate the gas phase partial oxidation reactions entirely, and instead perform all of the partial oxidation reactions on a highly active catalyst (usually Rh) to convert the hydrocarbon catalytically at such a high rate or low dwell time that the gas phase reactions, or combustion stoichiometry, never have the opportunity to occur. It is crucial that the gases fed to a CPO catalyst be thoroughly premixed in order to avoid gas phase reactions which damage the catalyst, reduce its activity and promote non-complete combustion reactions. Also, while more selective than gas phase POX, CPO catalysts currently known have not exhibited such high levels of steam reforming activity that would permit them to reform over-oxidized feeds at the high space velocities employed in CPO. Thus, it is especially critical in CPO to avoid nonselective gas-phase oxidation, and therefore it is especially important to provide premixed feed, which is slower to begin gas phase chemistry. Also it is especially important to provide the premixed feed at high temperature and velocity to enable the catalytic reaction of the premixed gases at short contact times. However, it is dangerous to premix heated methane and oxygen and it is difficult to avoid gas phase reactions between these gases, which proceed at undesirable combustion stoichiometry to produce steam and carbon dioxide.

For catalytic partial oxidation (CPO), while certain metals can catalyze the desired oxidation chemistry at very short contact times, it is necessary to premix the methane and oxygen gases at high temperature, pressure and velocity to enable the catalytic reaction to proceed at short contact times in reduced scale reactors, and so that the chemistry occurs at the correct stoichiometry throughout the catalytic zone. The use of catalyst-impregnated monoliths can catalyze the desired chemistry with residence times below about 0.05 sec. When compared to conventional ATR reactors, FBSG reactors and GPOX reactors, this represents more than a one hundred fold decrease in residence time and, therefore, in residence volume. However, such a reactor is unworkable without a means to premix $CH_4$ or other hydrocarbon and $O_2$ at high temperature, pressure, and velocity, safely and while avoiding gas phase reactions that are not within the desired partial oxidation zone and/or in contact with the catalyst. In other words, the catalytic partial oxidation process has the potential to provide extraordinary reactor productivity in view of the extremely high space velocities of the throughput if the aforementioned problems are avoided.

It is known that successful operation of the catalytic partial oxidation (CPO) process on a commercial scale requires high conversion of the hydrocarbon feedstock at high hourly space velocities, using preheated mixtures of oxygen gas and methane in a preferred ratio of about 1:2, or 0.5, and under elevated pressures. Reference is made to Jacobs et al. U.S. Pat. No. 5,510,056 (Shell) for its disclosure of such a process.

The problems with such known processes are that they are dangerous, since pre-formed preheated mixtures of oxygen and methane, at pressures of interest for syngas production, e.g., 10 atmospheres or more, are co-reactive and explosive, and any gas stage reaction or autoignition prior to introduction to the reaction zone, results in combustion stoichiometry which is highly exothermic and produces catalyst sintering.

It has been proposed to conduct a high efficiency catalytic partial oxidation (CPO) process using pre-formed mixtures of high temperature, high pressure methane and oxygen gases and steam at space velocities up to 500,000 $hr^{-1}$, using a mixing and distributing means having a plurality of mixing tubes within which the gases are mixed prior to discharge through a multi-disc catalyst stack. Reference is made to EPO 303,438, assigned to Davy McKee Corp., which discloses a high temperature, high pressure partial oxidation process, and a mixing and distribution catalyst bed apparatus for producing a gaseous reaction product comprising methane, carbon oxides, hydrogen and steam in the absence of a reforming reaction. The preheated methane and oxygen gases are combined in the mixing tubes, through small orifices, and are discharged from the tubes at a distance downstream of the orifices sufficient to produce mixtures of the gases prior to discharge from diverging nozzles which reduce the velocity of the gas mixture at the inlet to the partial oxidation catalyst zone.

The mixing and distribution means of EPO 303,438 is ineffective in enabling the desired stoichiometry, i.e., $2CH_4 + O_2 \rightarrow 2CO + 4H_2 + OH_2O$, to produce the most useful syngas to the exclusion of other than very small amounts of $CO_2$, $H_2O$ and $CH_4$. This appears to be due to the fact that such mixing and distributing means is inadequate and allows the heated methane and oxygen to co-exist in the gaseous state, upstream of the partial oxidation catalyst zone, for too long a residence time, such as more than about 9 milliseconds, so that the methane and oxygen initiate non-catalytic reaction in the gaseous state to produce the wrong or undesirable stoichiometry, resulting in the production of steam and $CO_2$, reduced amounts of $H_2$ and CO and high heat generation which can result in catalyst sintering or agglomeration and waste, and damage to the apparatus.

Furthermore, the control of pressure drop through the mixing and distributing means appears to be inadequate. Specifically, EPO 303,438 and the related WO 90-06282 disclose a fuel stream pressure drop of 0.0% of downstream pressure, while related WO 90-06281 discloses a fuel stream pressure drop of 2.2% of downstream pressure and related WO 90-06297 is silent regarding fuel pressures. Inadequate control of pressure drop through the mixing and distributing means results in reactor instability and in nozzle to nozzle variations in gas stoichiometry, which facilitates non-catalytic reaction in the gaseous state to produce the wrong or undesirable stoichiometry, facilitates hot spots and carbon deposition, and can result in catalyst agglomeration and waste, and damage to the apparatus.

SUMMARY OF THE INVENTION

The present invention relates to a novel compact apparatus and an efficient process for the partial oxidation of light hydrocarbon gases to convert such gases, such as methane, to valuable synthesis gas at moderate $H_2/CO$ ratios desired for subsequent hydrocarbon synthesis. The essence of the present process involves providing sources of a light hydrocarbon gas containing one or more $C_1$ to $C_4$ alkanes, such as methane, and oxygen or an oxygen-containing gas, preheating and pressurizing said gases, and injecting said individual gases at high velocity through a plurality of isolated small passages of an injector manifold, into admixture with each other to form a gaseous premixture having a pressure at least 3% lower than the lowest upstream pressure of either gas and having the desired stoichiometric molar proportions, e.g., oxygen ($O_2$) to carbon (C) molar ratio of from 0.3 up to 0.8 to 1.0 mole of (C), preferably 0.45–0.70. The gaseous premix is formed at a plurality of injection nozzles or cups or mixing zones which are open to the reaction zone and are spaced over the face of an injector of the type used in the rocket or aerospace industry. The gaseous premix is injected before an autoignition residence time after impingement at the mixing zones or within the injector nozzle cups, and any gap or catalyst-free zone, and preferably within less than 9 milliseconds, more preferably within less than 2 milliseconds and most preferably within less than 0.5 millisecond, at a velocity between about 25 and 1000 ft/sec, preferably 50 and 500 ft/sec, and most preferably between 50 and 300 ft/sec, into a partial oxidation reaction zone comprising a catalyst retained in a fixed arrangement, such as into the catalytic passages of a parallel-pore ceramic monolith, or a ceramic foam monolith, or a fixed bed of particulate catalyst, so that the gaseous premix reacts before or simultaneously with the autoignition time delay of the mixture, to reduce the amounts of $CO_2$, $H_2O$ and heat produced by the partial oxidation reaction to favor the desired stoichiometry, i.e., $$2CH_4 + O_2 \rightarrow 2CO + 4H_2 + OH_2O \quad (-5.7 \text{ kcal/g mol } CH_4).$$

The present process and apparatus represents an improved catalytic partial oxidation (CPO) process by rapidly premixing the light hydrocarbon fuel gas and the oxidizing gas, and substantially reducing the delay time between the mixing of the preheated, pressurized reactant gases in the desired relative amounts or proportions and the introduction of the homogeneous mixture to the catalytic partial oxidation zone. The reduced delay time or duration of existence of the formed stoichiometric mixture, prior to controlled reaction, avoids the problems of gas phase ignition and reaction in advance of the catalytic zone, which is detrimental to the CPO process, and avoids the dangers of over-oxidation (as occurs when gas phase chemistry begins before catalytic chemistry), and avoids the dangers normally presented by the explosive nature of a preheated mixture of oxygen and methane.

The present process and apparatus enables the partial oxidation reaction to be completed while the gaseous premix is in contact with the catalyst as a homogeneous mixture, since uniform gaseous premixtures are formed at and ejected from the plurality of mixing nozzles which are distributed over a wide diameter injector face, which greatly aids in the distribution of the reactants across the inlet of the reactor, thereby avoiding the introduction of oxygen-lean or oxygen-rich gas mixtures, which can interfere with the desired stoichiometric reaction and can result in hot spots which can burn or sinter the catalyst and/or destroy the solid monolith carrier.

The hydrocarbon gas stream introduced to the mixer/injector may contain components other than methane and $C_2$–$C_4$ hydrocarbons. Other components, for example $H_2O$ and $CO_2$, may be present in the hydrocarbon gas in relatively large amounts, such as from about 0.0 to 1.0 mol of $H_2O$ or $CO_2$ per carbon atom of the light hydrocarbon gas. Other components, for example, $H_2$, CO, Ar, $N_2$, $NH_3$, HCN, $H_2S$, COS, $CS_2$, organic sulfur-containing compounds, organic oxygenates, and $C_5+$ hydrocarbons may be present in lower concentrations, typically less than 0.10 mol of the component per carbon atom of the light hydrocarbon gas although higher levels may be present. The oxygen-containing gas stream introduced to the mixer/injector may likewise contain components other than oxygen. These components are typically $N_2$, $CO_2$, $H_2O$ and Ar. Some of these components, especially $N_2$, $CO_2$, $H_2O$, may be present in major amounts, from 0.0 to 4.0 mol per mol of oxygen ($O_2$). Other components are typically present in lesser amounts, normally less than 0.1 mol of component per mole $O_2$.

It will be recognized by those skilled in the art, that the uniform gaseous premixes that are formed when the hydrocarbon stream and the oxidant stream are ejected into the mixing area of nozzle will not be perfectly mixed at the point of initial contact. In any real physical device, some time or distance will be required before perfect mixing is achieved. As used herein, the term "feed stream" means the individual streams, such as hydrocarbon or oxygen containing gas, that are being fed to the mixing area or feed nozzle, and the term "gaseous premix" means the physical combination of these feed streams in a state that is highly mixed. Of greatest importance in the present invention is that the streams achieve a high degree of mixedness in a minimum amount of time, and most preferably before gas phase or catalytic reactions begin to occur at any substantial level. In order to quantify this degree of mixedness, the measure "Efficiency of Mixing", abbreviated as $E_m$, is used. $E_m$ is calculated from the composition profile of a stream such as a gaseous premix. Composition profiles can be obtained by sampling the stream at many locations, or by use of other diagnostic tools. For example, imaging the Rayleigh-scattered light of a laser beam can, under properly controlled conditions, provide composition variations across partially mixed streams. The composition data is used to calculate how much of each feed stream is present at each location. For example, if one is mixing air with methane, the oxygen and nitrogen mole fractions would be combined to represent the mole fraction of the air stream.

For the case where hydrocarbon (abbreviated HC) and oxygen-containing (abbreviated OX) feed streams being mixed, we define $E_m$ using the following equation:

$$E_m = ((X_{HC}/X_{OX})_{MIN}/(X_{HC}/X_{OX})_{MAX})^{0.5}$$

Where $X_{HC}$ and $X_{OX}$ represent mole fractions in the admixed stream of hydrocarbon or oxygen-containing feed stream, and the subscripts "MIN" and "MAX" designate that these are the minimum and maximum ratios found in the stream. Thus, $(X_{HC}/X_{OX})_{MIN}$ represents the minimum HC/OX mole fraction ratio found in the composition profile. As so defined, $E_m$ reaches a value of 1.0 when the gases are perfectly mixed, and will have a value of 0.0 if the stream has any locations that are completely unmixed (has a location where the composition is equal to that of either feed stream).

In the practice of the present invention, the gaseous premix achieves a high degree of mixedness, quantified as $E_m$, in a minimum amount of time, and most preferably before gas phase or catalytic reactions begin to occur at any substantial level. We specify this rate of achieving high mixedness by specifying the distance downstream of the injector at which a given $E_m$ level will be attained. Because injector sizes may vary greatly, and because mixing distances tend to scale linearly with injector size, we define the distance downstream of the injector in proportion to some critical nozzle dimension. In particular, we define L as the distance downstream of the mixing nozzle, and we define D as the diameter or similar dimension of the largest orifice through which either feed stream is introduced into admixture in the nozzle. $D_{AX}$ is the diameter of the exit orifice feeding the gas steam that is most axial with the gaseous premix path, or most near the center of the injector or as the stream being introduced in the fewest number of orifices within the nozzle. It is preferred that mixing nozzles be used in the present invention that achieve an $E_m > 80\%$ at a distance downstream of $L/D_{AX}$ less than 10, more preferably up to about 6. It is more preferred that nozzles achieve $E_m > 90\%$ within this distance, and most preferred that nozzles achieve $E_m > 95\%$ within this distance downstream.

An important parameter defining the effectiveness of mixing is the "momentum ratio" of the streams being mixed. The momentum of a stream is defined as the product of velocity of the stream as it is injected into the mixing zone multiplied by the stream's mass rate. For efficient mixing the ratio of the momentums of the mixed streams should be comparable. Poor mixing performance can occur if momentums of the streams are disparate. In the case of a mixing nozzle with axial injection of oxygen-containing gas and radially—or somewhat radially—injected hydrocarbon gas, the ratio of the momentum of the hydrocarbon gas to the momentum of the oxygen-containing gas is preferably in the range of 0.5–4.0, most preferably from 1.0–3.0. For the opposite case of axially-injected hydrocarbon gas and radially—or somewhat radially—injected oxygen-containing gas, the ratio of the momentum of the hydrocarbon gas to the momentum of oxygen-containing gas is in the range of 0.25–2.0, preferably from 0.33–1.0. It is understood that if a gas is injected in more than one stream into a mixing chamber then the sum of the momentums, or summed momenta, of all of the streams of the particular gas is used in the calculation of the momentum ratio.

The present multi-orifice, large diameter injectors operate at extremely high speeds, up to sonic speeds, and discharge the separate gases, e.g., methane and oxygen, in a predetermined ratio from closely-spaced orifices, i.e., within up to about 0.5 inch of each other, into direct contact with each other within a plurality of small mixing nozzles or cups at the injector surface, or at an angle of from about 60° up to about 180° relative to each other for intersecting contact or impingement and admixture immediately above the injector surface, for discharge or injection of the homogeneous preheated pressurized gaseous premix into the reactor or combustion chamber at extremely high speeds. The dwell time of the gaseous premix within or immediately above the injector surface prior to passage into the reaction zone is less than about 9 milliseconds, preferably less than about 2 milliseconds, and most preferably less than 0.5 millisecond, to substantially avoid undesirable gas phase reactions upstream of the combustion zone. Also the velocity of the homogeneous gas mixture as it is ejected from the mixing nozzles is from about 25 to 1000 ft/sec, more preferably between about 50 to 500 ft/sec and most preferably between about 50 and 300 ft/sec, whereby efficient syngas production is enabled by compact reactors of higher throughput than heretofore possible. As used herein, references to the velocity at which the gaseous premix is passed to the partial oxidation zone should be taken to mean the local gas velocity as the gaseous premix leaves the mixing nozzles, and not some reactor-average superficial velocity.

A critical feature of the present high speed gas mixers/injectors is that they are designed to operate with a drop or reduction of the gas pressure through the mixer/injector which is more than 3%, preferably more than 5% and possibly more than about 10% lower than the lowest upstream pressure ($P_u$) of either of the streams of the individual gases. The inlet pressure of the reactor ($P_c$) is normally between 10 and 100 atmospheres, preferably between about 20 and 50 atmospheres, so that the pressure reduction, or $\Delta P/P_c = (P_u - P_c)$, divided by the reaction chamber pressure, or Pc, is >3%, preferably >5% and possibly >10%. This pressure drop causes the oxidation gas and the hydrocarbon gas to be drawn into more intimate admixture immediately in advance of passage into the reaction chamber, to form the desired stoichiometric gaseous premix containing between 0.3 and 0.7 mols of oxygen ($O_2$) per mol of methane, which has a single carbon atom, or per carbon atom if the light hydrocarbon gas is one having more than one carbon atom. The pressure drop also improves the uniformity of flow of the gases through the mixer/injector means to avoid instabilities. This is particularly important in the case of economically advantageous, very large reactors which employ a plurality of side-by-side mixers/injectors to supply the gaseous premix to the catalytic partial oxidation zone of the large-diameter reactor, particularly for CPO processes which employ catalytic reactors, most particularly catalyst metallic of ceramic monoliths and ceramic or metallic foams which require the homogeneous or uniform supply of the reactant gaseous premix. The pressure drop as the gases pass through the injector results in a high gas mixing efficiency ($E_m$) a short distance beyond the face of the injector to produce the gaseous premix of the gases having the desired stoichiometry immediately in advance of the passage of the mixture into the catalytic partial oxidation zone of the reactor. The desired ratio of the hydrocarbon gas and the oxygen gas always has an excess of the hydrocarbon to prevent over-oxidation and to discourage pre-ignition. In cases where the mixing nozzles of the injector are cups or wells recessed below the face surface of the injector, the point of 90% to 95% $E_m$ occurs at a location (L) which depends upon the diameter (D) of the largest gas orifice to the cup or well, i.e., $E_m$ occurs at a L/D of 6 or less. As mentioned, this mixing efficiency is enabled by the uniform pressure drop, or $\Delta P$, as the gases pass through the isolated small passages of the injector manifold and through the nozzle orifices to impinge at each of the mixing zones, nozzles or cups, and the uniformity of the pressure drop assures uniform continuous gas supply to each of the mixing nozzles or cups even when a plurality of injector means are assembled side by side and fed through common gas conduits to feed very large diameter reactors.

The present apparatus enables a partial oxidation reaction that is fed by a more homogeneous or uniform supply of reactant gaseous premix composition. Because the gaseous premix is a mixture of hydrocarbon and oxygen-containing streams that is very reactive, particularly reactive at the high pressures and temperatures desired for syngas generation, the time available to mix the gases before introducing the gaseous premix into the partial oxidation zone is very limited. Thus, we have discovered that feed injectors that achieve high levels of $E_m$ in very short physical distances—distances on the order of inches, not feet, achieve high $E_m$ in short $L/D_{AX}$ wherein $D_{AX}$ is the diameter of the axial stream orifice, usually the oxygen gas orifice, and L is the distance downstream from the point of initial contact between the gases, such as the lowest level of the radial gas orifices adjacent the cup floor containing the axial gas orifice. However, for the large scale reactors of commercial interest, use of single injectors would require a large $D_{AX}$ at any reasonable injector velocity, and so achieving high $E_m$ in a short $L/D_{AX}$ is not sufficient. Thus a critical feature of this invention is the use of an injector having a plurality of mixing nozzles or chambers or cups, which serves to reduce the injector dimensions (reducing $D_{AX}$) and reduce the physical distance (and hence time) required to achieve a high degree of feed uniformity.

Finally, the use of a plurality of injector nozzles presents the problem that multiple nozzles can interact and become unstable, and also presents the problem that multiple injector nozzles must all be fed at the same stoichiometry. Thus, a third key feature of this invention is the use of an elevated pressure drop $\Delta P$ or $P_u - P_c/P_c$ for the feed streams in the nozzles to provide uniform, stable, and non-interacting flows of gaseous premix into the partial oxidation zone.

DETAILED DESCRIPTION OF THE DRAWINGS

Figure 1:
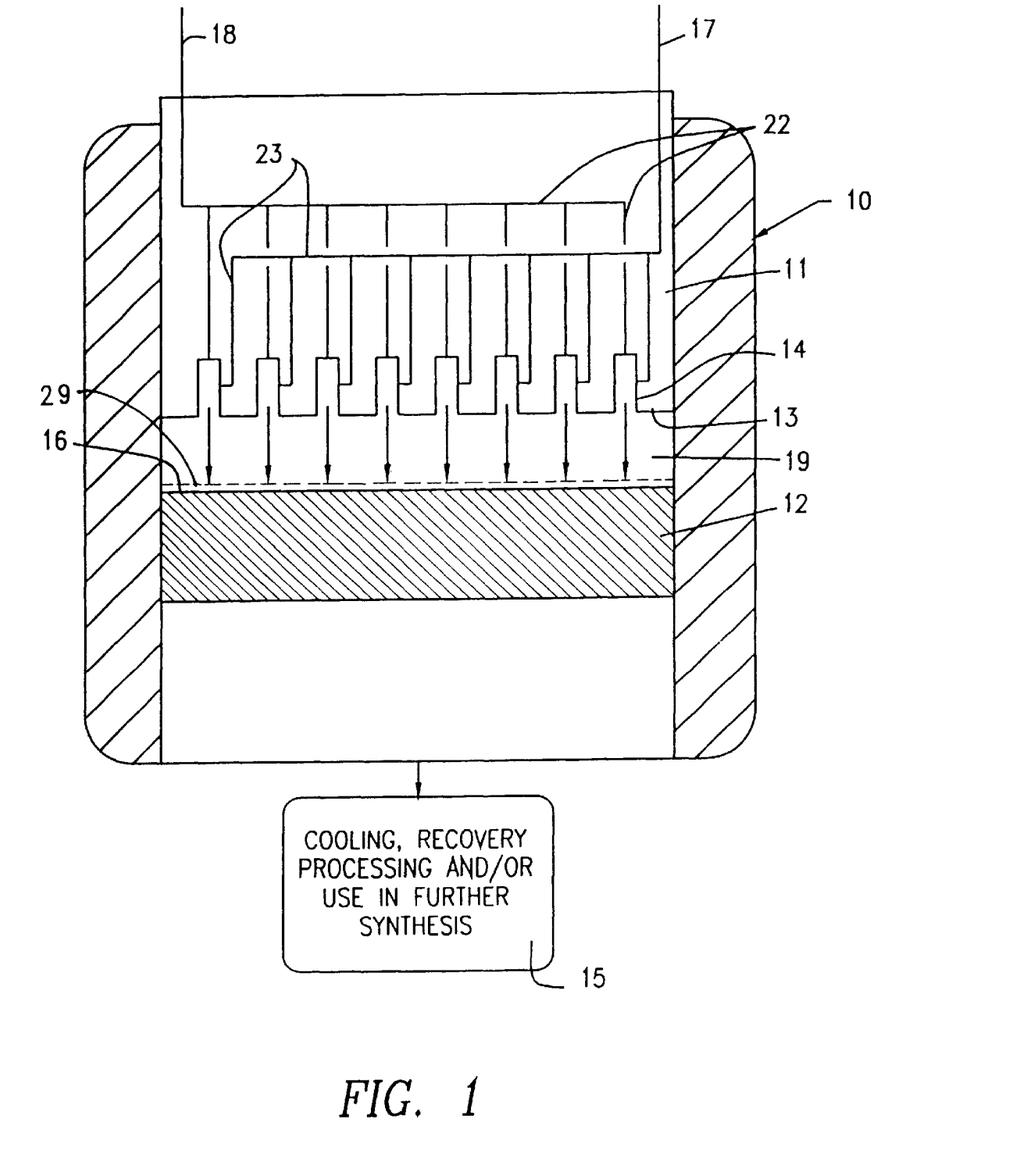
FIG. 1 is a diagrammatic side view illustration of a compact injector/monolith apparatus according to one embodiment of the present invention.

Referring to FIG. 1, the gas injector/catalyst monolith reactor apparatus 10 thereof comprises an assembly of an upper multi-jet, face-mix gas injector means 11, a lower reactor containing a catalytic zone 12 comprising a bed of catalyst in fixed arrangement, illustrated in FIG. 1 as multi-passage, catalyst-impregnated, solid monoliths forming a reaction zone in closely-spaced alignment with the face surface 13 of the injector means 11 and a downstream syngas recovery and/or processing unit 15. The plurality of jet nozzles or cups 14 at the face surface 13 of the injector means 11 are closely-spaced from the inlet passages at the inlet face 16 of the catalyst monoliths of catalytic zone 12 to assure the uniform injection of a homogeneous gaseous premix of methane and oxygen, in the desired predetermined oxygen/carbon molar ratio of about 0.3–0.8, preferably 0.45–0.7, into all of the monolith inlet passages. Separate methane supply conduit 17 and oxygen supply conduit 18 feed continuous streams of preheated, pressurized methane and oxygen into and through the manifold methane passages 23 and oxygen passages 22 for intermixing within the plurality of jet nozzles or cups 14. The methane passages 23 and oxygen passages 22 each have exit orifices sized so that the pressure drop of the gas as it passes through these passages and orifices is reduced to a pressure that is more than 3%, preferably more than 5% and possibly more than 10% lower than the pressure of the lower of the upstream pressures in the methane conduit 17 or the oxygen conduit 18. This ensures even distribution of methane and oxygen to the plurality of jet nozzles or cups 14, ensuring that each jet nozzle or cup has the same oxygen/carbon ratio, which uniformity eliminates local hot spots and local carbon deposition within the catalyst bed.

In some cases the gap 19 between the injector face surface 13 and the inlet face 16 of the monolith of the catalytic reaction zone 12 can be eliminated. However, in most cases some radial dispersion of the gaseous premix from the jet nozzles 14 is required to supply a uniform gaseous premix to all of the monolith inlets at the inlet face 16, so that a small gap 19 is required, provided that it is small enough to permit a cumulative gas residence time of the gaseous premix in the injector means 11 and in the gap 19, and in any uncatalyzed entry zone to the monolith, serving as a gas permeable, refractory heat shield, shown as 29 in FIG. 1, which is substantially less than the autoignition delay time of the mixture, preferably, less than 9 milliseconds, more preferably less than 2 milliseconds, and most preferably less than about 0.5 millisecond. This prevents reaction of the gas mixture in the gas phase, out of the catalytic reaction zone 12 and out of contact with the catalyst, which reaction would proceed at the wrong stoichiometry and produce less desirable syngas, containing steam, and excessive heat generation.

The reaction of the gaseous premix within the catalytic reaction zone 12, in contact with the fixed catalyst bed, such as the catalyst monolith, requires means to cause the reactions to initiate on the catalyst in the partial oxidation zone. This is accomplished, preferably, by the use of electrical heating means to pre-heat the fixed arrangement of catalyst to at least the low end of the partial oxidation reaction temperature range, which range is from about 700°–1650° C., more preferably from about 870°–1320° C., to initiate the reaction. Other suitable heating means include any means for heating the reactor and the catalytic zone 12 by thermal radiation, use of hot gas, etc. Catalyst compositions suitable for use in the catalytic partial oxidation of hydrocarbons are known in the art. Preferred catalysts for use in the process of the present invention comprise as the catalytically active component, a metal selected from Group VIII of the Periodic Table of the Elements. Preferred catalysts for use in the process comprise a metal selected from nickel, ruthenium, rhodium, palladium, osmium, iridium and platinum, most preferably nickel, ruthenium, rhodium or iridium. The catalytically active metal may be used in metallic form, as in wire mesh or metal shot or metal monolith. If desired, one or more metals can be coated on or combined with other metals. The catalytically active metal may also be supported on suitable carrier materials well known in the art, including the refractory oxides, such as silica, alumina, titania, zirconia and mixtures thereof. Mixed refractory oxides, comprising at least two cations, may also be employed as carrier materials for the catalyst.

The catalytically active metal may be deposited on the refractory oxide carrier by techniques well known in the art. A most suitable technique for depositing the metal on the carrier is impregnation, which typically comprises contacting the carrier material with a solution of a compound of the catalytically active metal, followed by drying and calcining the resulting material.

In use in the process of the present invention, the catalyst is retained in form of a fixed arrangement. The fixed arrangement may comprise a fixed bed of catalyst particles. Alternatively, the fixed arrangement may comprise the catalyst in the form of a monolith structure.

The fixed arrangement may consist of a single monolith structure or, alternatively, may comprise a number of separate monolith structures combined to form the fixed arrangement. A preferred monolith structure comprises a ceramic foam. Suitable ceramic foams for use in the process are available commercially.

The gas injector 11 of FIG. 1 comprises a methane ($CH_4$) supply conduit 17 and an oxygen ($O_2$) supply conduit 18 which feed separate continuous streams of preheated, pressurized methane and oxygen gases into and through the manifold methane passages 23 and oxygen passages 22, respectively, of the injector 11 for intermixing within the plurality of jet nozzles or cups 14 at the face surface 13 of the injector means 11 or for angular impingement immediately above the face surface 13 of the injector means 11.

An essential feature of the present invention is to create and maintain a gas pressure drop through the injector means 11 which is more than 3%, preferably more than about 5%, and possibly more than about 10% lower than the lowest upstream pressure ($P_u$) of either of the gases of the gaseous premix relative to the pressure ($P_c$) at the inlet to the catalytic reaction zone 12, i.e., $\Delta P/P_c$ or $(P_u-P_c)/P_c$. The upper limit of this value can become impractically high as the flow velocity through the injector approaches sonic. Generally the flow velocity is maintained within practical limits for economic reasons and to avoid or reduce erosion in catalyst beds.

The injection of the present pre-heated and pressurized light hydrocarbon and oxygen gases into admixture in the desired proportions to form a gaseous premix having a pressure drop as discussed above, and then into the reaction zone, preferably within a time period of less than 9 or 2 or 0.5 milliseconds, is the essence of the present catalytic partial oxidation process. There may be a narrow non-reaction gap 19 and/or a gas permeable thin refractory heat shield monolith 29, shown in FIG. 1, between the injector face surface 13 and the inlet face 16 of the catalytic reaction zone, so that the dwell time of the mixture may be slightly greater than the aforementioned preferred time periods but must still be less than the autoignition delay time of the mixture. It is highly advantageous for safety and efficiency reasons, and to reduce the overall length of the apparatus, to form the desired gaseous premix of the pre-heated pressurized gases, using a wide diameter multi nozzle injector, or an assembly of such injectors, and to inject or blow the homogeneous gaseous premix immediately into a wide diameter reaction zone, comprising a fixed catalyst bed, for immediate reaction since the gaseous premix is pre-heated, pressurized, homogeneous and has the desired stoichiometry for the most desirable syngas formation. The heat shield 29 protects the injector against the heat of the reaction zone, which has a temperature between about 700°–1650° C., preferably between about 870°–1320° C.

Figure 2:
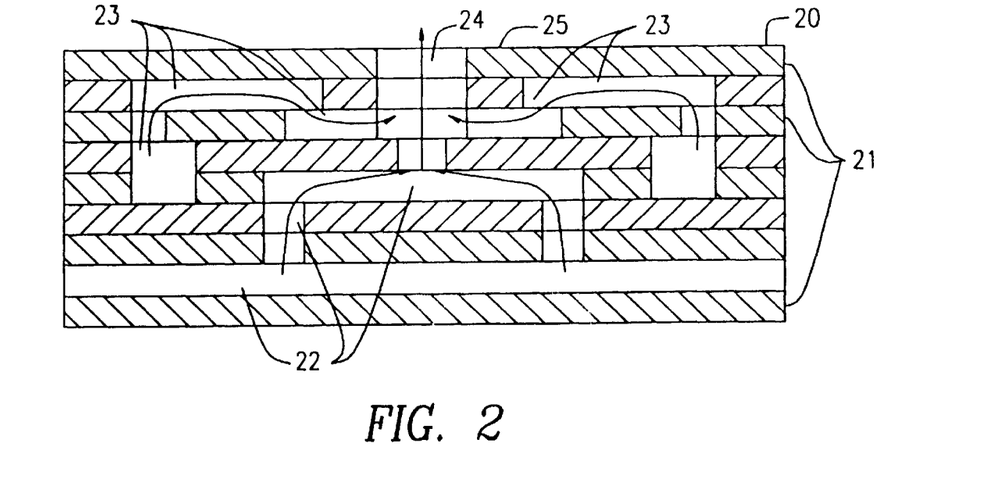
FIG. 2 is a cross-sectional side view of a single nozzle section of a multi-jet face-mix injector useful in association with a syngas reactor according to the present invention.
Figure 3:
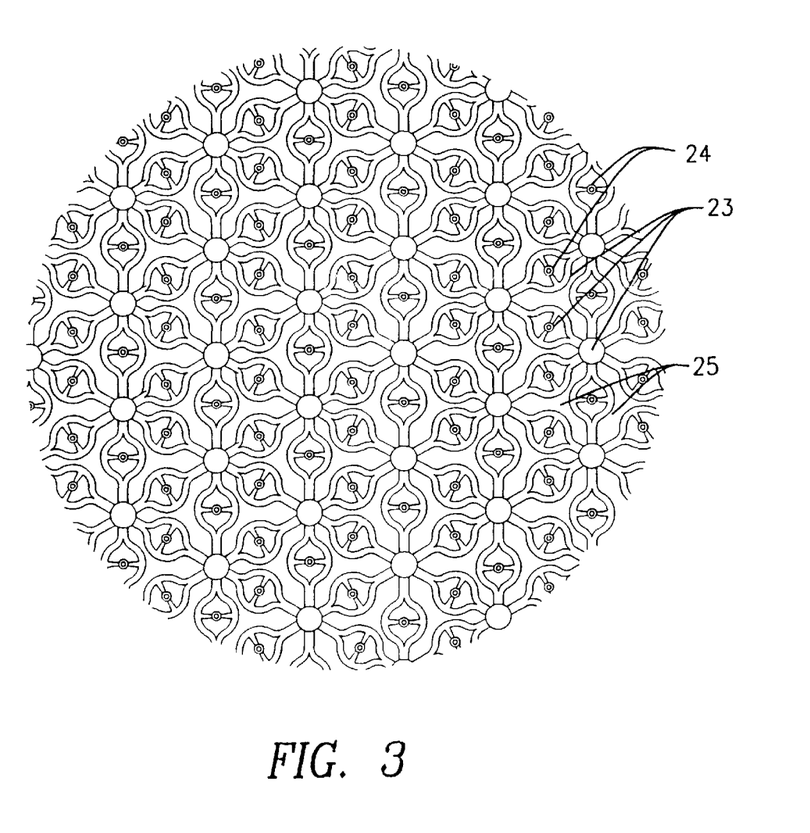
FIG. 3 is a plan view of the face and certain channels beneath the face surface of a multi nozzle injector as illustrated in FIG. 1.

Suitable feed injectors that meet these criteria have been developed for use in the aerospace industry. One such device is called a microinjector (or platelet) burner face. The principal of this injector is that many small mixing nozzles ("microjets") are uniformly-spaced over one large diameter face. Any mixing approach can be used in the nozzles, but some will be more amendable to fabrication and to rapid mixing. A preferred approach is the use of mixers or nozzles called "triplets", in which there is a flow of one reactant, such as oxygen, through the oxygen passages of a manifold and up through an exit orifice in the floor of each recessed nozzle or cup, as at least one axial flow, and the second reactant, such as methane, is introduced to each nozzle or cup as two or more opposed or intersecting jets up to about 1 inch below the injector face and adjacent or slightly above the nozzle floor through isolated methane passages of the manifold to impinge the axial oxygen stream and form a gaseous mixture. An advantage of this triplet design as applied to the present process is that it has very good anti-flashback properties, which are highly desired for hot, high pressure $CH_4/O_2$ mixing. FIGS. 2 and 3 illustrate such an injector, manifold, isolated gas passages, injector face, and suitable triplet mixing nozzles or cups.

Injector faces of the type illustrated in FIG. 3 can be built in large diameters, with spacing of the mixing elements or cups 24 smaller than 1". Thus, to achieve homogeneous reaction mixtures, mixing lengths and residence times are kept very low. One embodiment for a fixed bed reactor is a design in which the injector face has a one-to-one correspondence and alignment between the microjet cups 14 or 24 and the channels at the inlet face 16 of a honeycomb catalyst monolith. In this special case, no radial mixing width or gap 19 is required outside the monolith itself, and all monolith channels are assured of receiving homogeneous reactant mixtures.

A preferred high velocity interior-mixing injector 20, developed for use in the aerospace industry, is illustrated by FIG. 2 of the present drawings and is illustrated by FIGS. 3–6 of U.S. Pat. No. 3,881,701, the disclosure of which is hereby incorporated herein by reference thereto. However, the exterior-mixing injectors illustrated by FIGS. 1, 2 and 2a of U.S. Pat. No. 3,881,701 are also suitable for use according to the present invention, whereby the reactant gases impinge and mix immediately above the injector surface. The platelet-type injectors of this Patent are produced by forming fine fluid-flow methane and oxygen passages on the surfaces of or within a plurality of thin plates 21 containing interconnecting bores in predetermined areas, and bonding the plates together to form injectors having manifolds containing fine isolated gas passages for oxygen and methane, which passages communicate within a plurality of microjet nozzles or cups 24 which are open at a face surface 25 of the injector, or which impinge immediately above the injector face surface, to mix the gases and eject the gaseous premix at high velocity. The present injectors are gas delivery manifolds which are engineered to provide equal specified flow to all nozzles or cups 24.

Referring to FIG. 2, of the Drawings, the injector 20 thereof comprises a plurality of thin metal plates 21 which are diffusion-bonded to each other after being provided in predetermined areas thereof with segregated oxygen passages 22 and methane passages 23, respectively, which communicate with sources of oxygen and methane, respectively, under high temperatures and pressures. The passages 22 and 23 divide the total flow of the individual gases into a very large number of precisely-metered, very small streams of the individual gases, which streams communicate within each of a plurality of mixing nozzles or cups 24 which are open to the surface 25 of the injector 20.

The injector means 20 isolates the heated, pressurized streams of the methane and oxygen until they mix within the plurality of cups 24 and are injected as a gaseous premix at high velocity of 25 to 1000 ft/sec, more preferably 50 to 500 ft/sec., most preferably 50 to 300 ft/sec., with a pressure drop greater than 3%, preferably greater than 5%, and possibly greater than 10% of the lowest upstream pressure of either gas. The gaseous premix is injected directly into the reactor 10, such as the inlet face 16 of the catalyst monolith, for reaction in the presence of the catalyst.

A further advantage of the gas mixers/injectors of FIG. 2 is that one or both gases can be used to cool the face surface 25 of the injector 20 by heat exchange therewith to mitigate chemical damage and prevent heat damage thereto due to the proximity to the reaction zone which has a temperature between about 700°–1900° C., preferably between 870°–1650° C. This cooling is accomplished by the circulation of the gas or gases preheated to feed temperatures of 100°–700° C., preferably between 300° and 600° C., through circulation passages, such as 23, immediately below and parallel to the uppermost plate 21 forming the face surface 25 of the injector 20 to cool the face surface 25 well below the reaction temperature, such as 1000° C., within the reaction zone, as the gas or gases pass through the manifold to the mixing cups 24.

FIG. 2 illustrates a cup 24 which may have a diameter of about 0.10" and a depth of about 0.10" which may be doubled to an extended depth of about 0.20", for example. The methane gas inlets 23 are split inlets, each having an exit orifice having a width W of about 0.05", which inject hot pressurized methane gas flows horizontally from opposed sides of the cup 24 radially against the vertical flow of hot pressurized oxygen gas introduced through the central inlet 22 having an exit orifice diameter of about 0.06", for example, to form the homogeneous reactant gaseous premix of reduced pressure which preferably is ejected from the cup 24 into the reaction zone in less than 9 milliseconds, more preferably less than 2 ms, and most preferably less than 0.5 ms.

Figure 4:
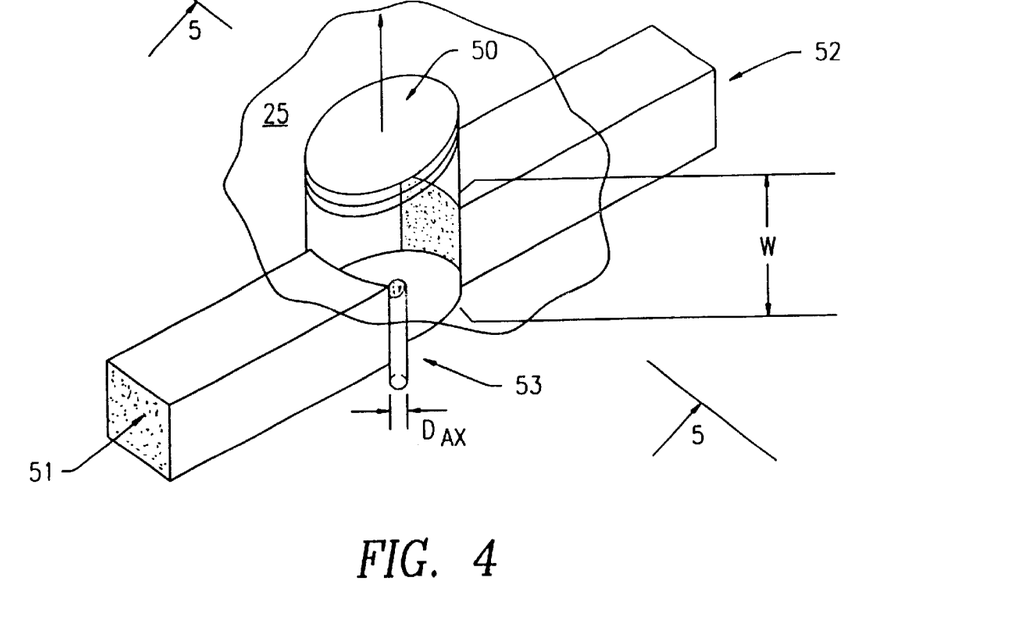
FIG. 4 is a perspective view of an individual injector mixing nozzle as present in the multi-nozzle injector of FIG. 2, according to one embodiment of the present invention.
Figure 5:
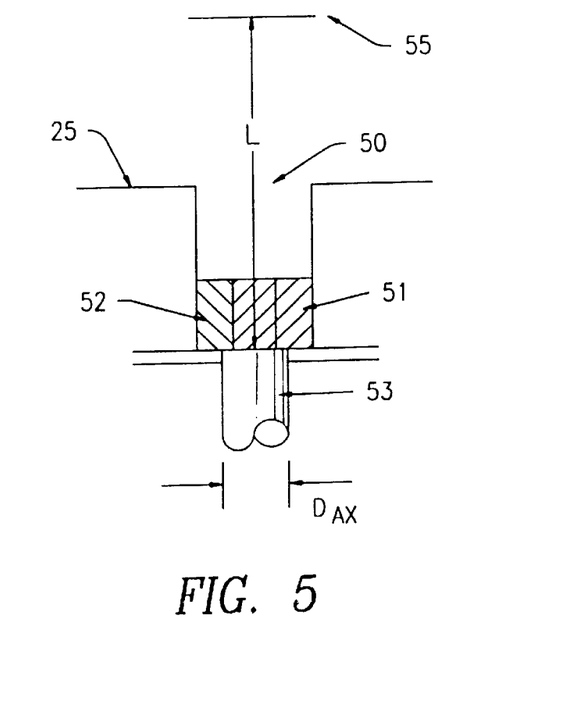
FIG. 5 is a cross-sectional view taken along the line 5—5 of FIG. 4.

FIGS. 4 and 5 illustrate an individual triplet mixing nozzle or cup 50 as an alternative design for the cup 14 of FIG. 1 or for the cup 24 of FIGS. 2 or 3. Referring to the nozzles 50 of FIGS. 4 and 5, the horizontal methane supply conduits 51 and 52 thereof each have an exit orifice width W of about 0.30", which are slightly offset relative to each other, as illustrated by FIG. 5, so that the methane gas flows therefrom, horizontally and tangentially against the vertical oxygen gas flow through central vertical oxygen conduit 53 having an exit orifice diameter $D_{AX}$ of about 0.30", to cause the gaseous mixture to swirl within the mixing cup 50 as the gaseous premix is formed and ejected. The gaseous premix ejected from the mixing cup 50 can be characterized for mixedness $E_m$ in a plane 55 located a distance L downstream, extending from the point of initial contact between the gases, e.g., the lower level of the radial gas orifices, adjacent the floor of the cup of the injector as illustrated by FIG. 5. Preferred injectors achieve $E_m$>80%, more preferably >90% or 95% at downstream distances L<10 $D_{AX}$.

The mixing cups 50 of FIGS. 4 and 5 have a design preferred for use in a catalytic partial oxidation (CPO) process operating with less reactive (e.g. lower temperature) gas feeds since the prolonged residence time created by the use of larger cups and wider gaps can result in gas phase chemistry. The larger dimensions described for mixing cups 50 of FIGS. 4 and 5 provide greater resistance to fouling, and are preferred when longer residence times can be accommodated without exceeding the autoignition delay time of the mixture. Injectors that provide for gas mixtures to be ejected and introduced into the catalytic reaction zone in shorter times (e.g., less than about 0.5 milliseconds) will have substantially smaller dimensions than, but may be similarly proportioned to, the injectors of FIGS. 4 and 5. The cup 50, preferably cylindrical, can have a diameter up to about one inch, preferably up to about one-half inch, and a depth, down to the exit orifice of the methane inlets, which is up to about one inch.

It will be apparent to those skilled in the art that the specific dimensions of the mixing nozzles of FIGS. 1 to 5 can be varied depending upon the particular syngas-producing conditions and the dimensions of the catalytic reactor being used in association with the injector, and the size of the latter. Dimensions of the oxygen and methane inlet conduits and cups will be sized appropriately to provide residence times and pressure drops specified herein to maintain a methane-to-oxygen ratio which is greater than 1, to avoid over oxidation, especially $CO_2$ formation, in all areas of the reactor before combustion begins.

According to a further embodiment of the present invention, the formed useful syngas is cooled, recovered and treated for use in further synthesis processing. Such treatment may include purification to remove the low amounts of ammonia and hydrogen cyanide produced in the partial oxidation process. Suitable processes for removing ammonia and hydrogen cyanide from gaseous streams are well known in the art. The removal of ammonia and hydrogen cyanide may be effected in a single stage or in a plurality of stages. The cooling step may be effected before or after the purification treatment steps as appropriate to accommodate preferred temperatures of the treatment process. Small amounts of hydrogen may be separated out of the syngas for use in hydrocarbon upgrading stages.

The treated syngas may be used in processes that produce methanol and methanol based products, hydrocarbon synthesis (HCS) products such as liquid hydrocarbons, olefins, alcohols and aldehydes, oxo-synthesis products, ammonia and ammonia based fertilizers and chemicals, town gas and reduction gas used for the production of sponge iron, etc. In a conventional hydrocarbon synthesis (HCS) process, liquid and gaseous hydrocarbon products are formed by contacting the present syngas comprising a mixture of $H_2$ and CO with a suitable Fischer-Tropsch type HCS catalyst, under shifting or non-shifting conditions. Suitable Fischer-Tropsch catalysts comprise one or more Group VIII catalytic metals such as Fe, Ni, Co, Ru, and Re. In one embodiment, the catalyst comprises catalytically effective amounts of Co and one or more of Re, Ru, Fe, Ni, Th, Zr, Hf, U, Mg, La on a suitable inorganic support material, preferably one which comprises one or more refractory metal oxides. Preferred supports for cobalt-containing catalysts comprise titania, particularly when employing a slurry HCS process in which higher molecular weight) e.g., $C_{10+}$ products, primarily paraffinic liquid hydrocarbon products are desired.

The hydrocarbon products produced by an HCS process according to an embodiment of the present invention are typically upgraded to form suitable products such as, synthetic crude oil, liquid fuels (e.g., jet and diesel), a lubricating, industrial or medicinal oil, waxy hydrocarbons, olefins (by e.g., catalytic cracking or steam cracking). These processes are well known to those skilled in the art and need not be described here. All or a portion of the HCS products can be fractionated and then converted in one or more steps, with or without a suitable catalyst, or in the presence of hydrogen, or both. Hydroconversion is usually preferred and includes mild hydrotreating (minimal branching) to make pumpable liquids, hydroisomerization (somewhat more branching, e.g., 25–65%, and preferably mono-methyl branching) for making distillates such as jet fuels and diesel fuels, and more severe hydroisomerization (wherein virtually none, e.g., less than 10 wt % and preferably less than 5 wt % of the feed remains unconverted) to make lube oils. These processes are also well known and reported in the literature in so far as catalysts and reaction conditions are concerned.

The foregoing description is only illustrative of the invention. Accordingly, the present invention is intended to embrace all alternatives, modifications and variances which fall within the scope of the appended claims.

What is claimed is:

1. A process for the catalytic partial oxidation of a hydrocarbon gas to synthesis gas containing hydrogen and carbon monoxide, comprising providing individual streams of a hydrocarbon gas and oxygen or an oxygen-containing gas, each stream being at independent elevated temperature and a pressure of 10 atmospheres or more, injecting said individual streams into admixture with each other through an injector means having a plurality of mixing nozzles and having separate passages for the hydrocarbon gas and the oxygen or oxygen containing gas, the pressure drop in the passages being at least 3% of the lowest upstream pressure of either of the streams of the individual gases, and obtaining a uniform flow of each of said gases through the injector means, forming a gaseous premix, passing said gaseous premix from the plurality of mixing nozzles within a time period shorter than its autoignition time into a catalytic partial oxidation reaction zone, containing a catalyst retained in fixed arrangement, to form said synthesis gas, and cooling and recovering said synthesis gas.

2. The process of claim 1 in which the pressure drop in the passages is at least 5%.

3. The process of claim 1 in which the pressure drop in the passages is at least 10%.

4. The process of claim 1 in which the catalyst comprises a fixed bed of catalyst particles.

5. The process of claim 1 in which the catalyst comprises a metallic or ceramic monolith or foam support impregnated with the catalyst.

6. The process of claim 1 in which the catalyst comprises at least one metal from Group VIII of the Periodic Table.

7. The process of claim 1 which comprises interposing a gas permeable thin refractory heat shield at the inlet to the catalytic partial oxidation zone to protect the injector means against the heat within the reaction zone.

8. The process of claim 1 in which each mixing nozzle comprises a mixing cup recessed below the face surface of the injector device into which the gas streams are separately introduced through gas orifices and impinged to form the gaseous premix.

9. The process of claim 8 in which one of the gases is injected from an axial orifice having a diameter ($D_{AX}$) as an axial stream having a momentum, and the other gas is injected from one or more sidewall gas orifices as one or more sidewall streams, having a momentum or summed momenta comparable to that of the axial stream, which impinge upon the axial stream to form the gaseous premix.

10. The process of claim 9 wherein the ratio of the summed momenta of the sidewall injected streams to the momentum of the axial stream is within the range of 0.5 to 4.0.

11. The process of claim 9 wherein the oxygen or oxygen containing gas is injected as the axial stream and the hydrocarbon containing gas is injected as the one or more sidewall streams.

12. The process of claim 11 wherein each of the mixing cups comprises a cylindrical cup recessed in the face surface of the injector means, comprising injecting the axial stream through an axial orifice having a diameter ($D_{AX}$) in the bottom of each cup, and injecting the sidewall streams through opposed sidewall orifices in the side wall of each cup to form a gaseous premix having an $E_m$>80% at a downstream distance (L) which is up to about six times the diameter ($D_{AX}$) of the axial gas orifice.

13. The process of claim 9 wherein the efficiency of the mixing ($E_m$) of the individual gases is at least 80% when the gaseous premix is at a distance (L) which is up to ten times the diameter ($D_{AX}$) of the gas orifice of the axial stream.

14. The process according to claim 9 which comprises introducing said sidewall gas streams as opposed but offset streams which impinge the axial stream tangentially to produce a swirling gas mixture within the mixing cups.

15. The process of claim 1 which comprises passing the gaseous premix into the reaction zone at a velocity between about 25 and 1000 feet/sec.

16. The process according to claim 15 which comprises passing the gaseous premix within less than 2 milliseconds after the mixture is formed.

17. The process according to claim 16 which comprises providing a plurality of said gas passages beneath and parallel to the metal plate forming the face surface of the injector means, and circulating at least one of the gases through said gas passages to cool the face surface of the injector means by heat exchange.

18. The process according claim 1 in which the molar proportions of oxygen ($O_2$) per number of carbon atoms in the hydrocarbon are between 0.3 and 0.8.

19. The process according to claim 16 which comprises passing the gaseous premix within less than 0.5 milliseconds after the mixture is formed.

20. The process according to claim 1 which comprises passing the gaseous premix into the partial oxidation reaction zone within less than 9 milliseconds after the mixture is formed.

21. The process according to claim 1 which comprises the step of injecting the individual streams through an injector means having a gas manifold assembled from a plurality of thin metal plates forming therebetween or therein and/or therethrough a plurality of segregated gas passages for supplying said individual streams through orifices into said mixing nozzles which are recessed areas at the face surface of the injector means.

22. The process according to claim 21 which comprises assembling said plates by diffusion-bonding them together.

* * * * *